(12) United States Patent
Cox

(10) Patent No.: US 7,230,409 B1
(45) Date of Patent: Jun. 12, 2007

(54) CURRENT LIMITING USING PWM CONTROL

(75) Inventor: Stanley Earl Cox, Farmers Branch, TX (US)

(73) Assignee: Augmentix Corporation, Houston, TX (US)

( * ) Notice: Subject to any disclaimer, the term of this patent is extended or adjusted under 35 U.S.C. 154(b) by 0 days.

(21) Appl. No.: 11/313,034

(22) Filed: Dec. 20, 2005

(51) Int. Cl.
*G05F 1/573* (2006.01)
*G05F 1/565* (2006.01)

(52) U.S. Cl. .................................. 323/284; 323/908
(58) Field of Classification Search ............... 323/265, 323/271, 282, 284, 285, 286, 351, 908
See application file for complete search history.

(56) References Cited

U.S. PATENT DOCUMENTS

| 4,928,200 A * | 5/1990 | Redl et al. .................... 361/94 |
| 6,960,904 B2 * | 11/2005 | Matsuura et al. ........... 323/283 |
| 7,109,692 B1 * | 9/2006 | Wu et al. .................... 323/282 |

* cited by examiner

*Primary Examiner*—Gary L Laxton
(74) *Attorney, Agent, or Firm*—Sprinkle IP Law Group

(57) ABSTRACT

A method and a system for current limiting using PWM control have been provided. The method includes sensing a load current to produce a control voltage. The control voltage is compared with a reference voltage to produce a detected output signal. Thereafter, the detected output signal is delayed and multiplied with a master PWM signal.

17 Claims, 3 Drawing Sheets

CURRENT LIMITING USING PWM CONTROL

BACKGROUND OF THE INVENTION

Controlled voltage power supply circuits can commonly be regulated but, regulation arrangements in variable power supply circuits are typically not able to provide adequate protection against over-current or short circuit conditions. One such circuit protection problem relates to fan start-up conditions that impact variable power supply requirements. The current drawn by fans at their start-up can be much greater than the normal current drawn for operating. Moreover, for those types of fans that are hot-swappable or are connected with cables, protection for a situation of over-current is required for both safety as well as equipment protection reasons.

FIELD OF THE INVENTION

The present invention relates, in general, to limiting current in electronic devices and more specifically to current limiting in electronic devices, such as DC motors used with fans, by using Pulse Width Modulation (PWM) techniques.

DESCRIPTION OF THE RELATED ART

To protect against over-current and short circuit, one technique uses circuit breakers and fuses. But circuit breakers are relatively expensive and fuses are difficult to replace once the over-current conditions are cleared. Moreover, fuses and circuit breakers must be selected to allow for the normal inrush current associated with starting fans which requires designing circuits for larger, current capability. If fuses or circuit breakers are not sized for this inrush current, then they must be slow-blow type devices that slowly respond in an over-current condition.

Another technique for protection against over-current and short circuit is to use a Pulse Width Modulation (PWM) control circuit for power supply. A primary PWM control circuit works by making a square wave with a variable on-time to off-time ratio, the on-time may be varied from 0 to 100 percent. In this manner, a variable amount of power is transferred to the load. But the primary PWM control circuit may operate in an open loop or control power based on factors other than load current.

In view of the foregoing discussion, there is a need for a technique that can regulate overload and short circuit without operator intervention once the load returns to a normal situation. Moreover, such a system is required that can respond instantaneously to inrush current on the start-up of a fan. Furthermore, a system is required that allows control of fan current to be independent of all the factors other than load current. The present invention addresses such needs.

SUMMARY OF THE INVENTION

The present invention relates to limiting current in electronic devices, such as electric motors. Specifically, the present invention relates to limiting current using PWM control.

An object of the present invention is to provide a system and a method for current limiting using a PWM signal independent of a master PWM signal. Moreover, the PWM signal is independent of all the factors other than a load current.

BRIEF DESCRIPTION OF THE DRAWINGS

So that the mariner in which the above recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a view of a system for current limiting using PWM control, in accordance with an embodiment of the present invention;

FIG. 2 is a view of a flowchart illustrating a method for current limiting using PWM control, in accordance with an embodiment of the present invention;

FIG. 3 is a view showing an unfiltered detector output and a filtered detector output, in accordance with an embodiment of the present invention; and FIG. 4 is a view showing a circuit diagram for current limiting using PWM control is shown, in accordance with an embodiment of the present invention.

DETAILED DESCRIPTION

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

An embodiment of the present invention relates to a system and a method for current limiting using Pulse Width Modulation (PWM). Another embodiment of the present invention relates to the controlling of the current to a fan independent of the master PWM signal. More generally, the embodiments of the invention are applicable to any DC motor or DC-to-DC power supply.

FIG. 1 is a view of a system 100 that limits current using PWM control, in accordance with an embodiment of the present invention. System 100 comprises a current sensing circuit 102, an over-current comparator circuit 104, a low-pass filter 106, and a one-bit multiplier 108. Current sensing circuit 102 measures a load current and produces a control voltage proportional to the load current. In an embodiment of the present invention, current sensing circuit 102 comprises a combination of resistors in a series with a load. In another embodiment of the present invention, current sensing circuit 102 comprises an operational amplifier. Further, the operational amplifier has a frequency response greater than a master PWM signal. The master PWM signal can be generated by a PWM generator. PWM generators are well known in art, and are readily commercially available from multiple suppliers. The selection of a suitable PWM generator is within the skill of the art, and does not comprise an element of this invention. The master PWM signal controls the final output based on factors other than the load current. Further, over-current comparator circuit 104 compares the control voltage with a reference voltage. The reference voltage is proportional to the specified maximum current limit of system 100. The maximum current limit is specified based on the circuit components of system 100. Over-current comparator circuit 104 generates a detected output based on the reference voltage and the control voltage. If the control voltage is greater than the reference voltage, the detected output is set to logic zero. If the control voltage is less than the reference voltage, the detected output is set to logic one. The detected output of comparator circuit 104 and the master PWM signal can have the same or different frequencies.

In an embodiment of the present invention, over-current comparator circuit 104 can be an amplifier, such as an LM393/SO, commercially available from a variety of vendors. Further, low-pass filter 106 delays the detected output. Low-pass filter 106 delays the detected output by the filter off-time during transition of the detected output from logic zero to logic one. The details of the delaying function are explained in conjunction with FIG. 3. In an embodiment of the invention, one-bit multiplier 108 multiplies the delayed detected output with a master PWM signal. One-bit multiplier 108 produces a PWM output signal that has power consistent with the lower of the delayed detected output and the master PWM signal. That is, if the delayed detected output or master PWM signal is logic zero then the PWM output is zero. In an embodiment of the invention, if the delayed detected output is logic one, then the PWM output is equivalent to the master PWM signal.

Figure 1:
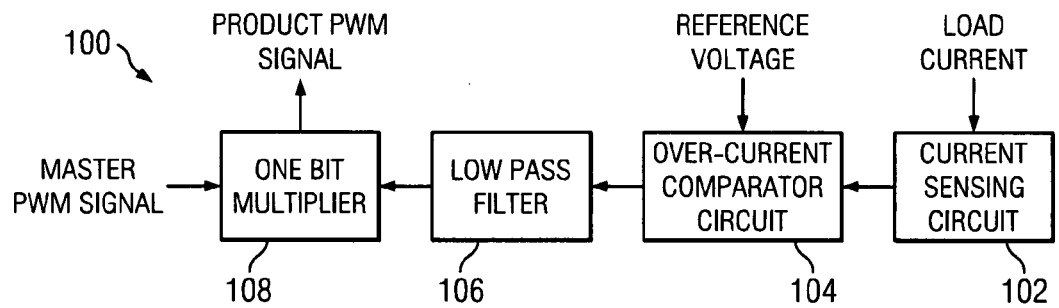
Figure 2:
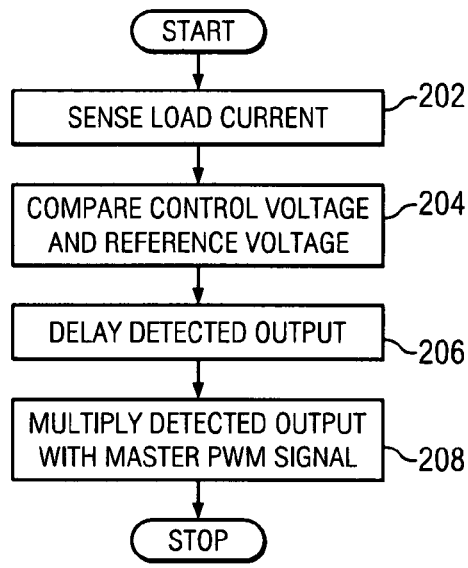

FIG. 2 is a view of a flowchart of a method for limiting current using PWM control, in accordance with an embodiment of the present invention. At step 202, a load current is sensed and a control voltage proportional to the load current is produced. In an embodiment of the present invention, the load current is sensed by current sensing circuit 102. In another embodiment of the present invention, an operational amplifier may be used for scaling the control voltage proportional to the load current.

At step 204, the control voltage is compared with a reference voltage. The reference voltage is proportional to maximum current limit of the system to be regulated. In an embodiment of the present invention, the appropriate reference voltage can be generated using a DC power source in combination with one or more resistors. In an embodiment of the present invention, the control voltage is compared with the reference voltage by over-current comparator circuit 104. When the control voltage is greater than the reference voltage, the detected output is set to logic zero, else the detected output is set to logic one. The details of switching of the detected output are explained in conjunction with FIG. 3.

At step 206, the detected output is delayed. In an embodiment of the present invention, the detected output is delayed by low-pass filter 106, which delays the detected output by the filter off-time during transition of the detected output from logic zero to logic one. The low pass filter further serves to decrease the frequency of the detected output. The reduction in the frequency is necessary to avoid interaction with the components used for reducing electromagnetic interference in a switching power supply. The output of low-pass filter 106 is hereinafter referred to as a delayed detected output. At step 208, the delayed detected output is multiplied with a master PWM signal. In an embodiment of the invention, the delayed detected output is multiplied bit-by-bit with the master PWM signal by one-bit multiplier 108 to yield a product PWM signal. The product PWM signal has power consistent with the lower of the delayed detected output and the master PWM signal. That is, if the delayed detected output or master PWM signal is logic zero, then the PWM output is zero.

Figure 3:
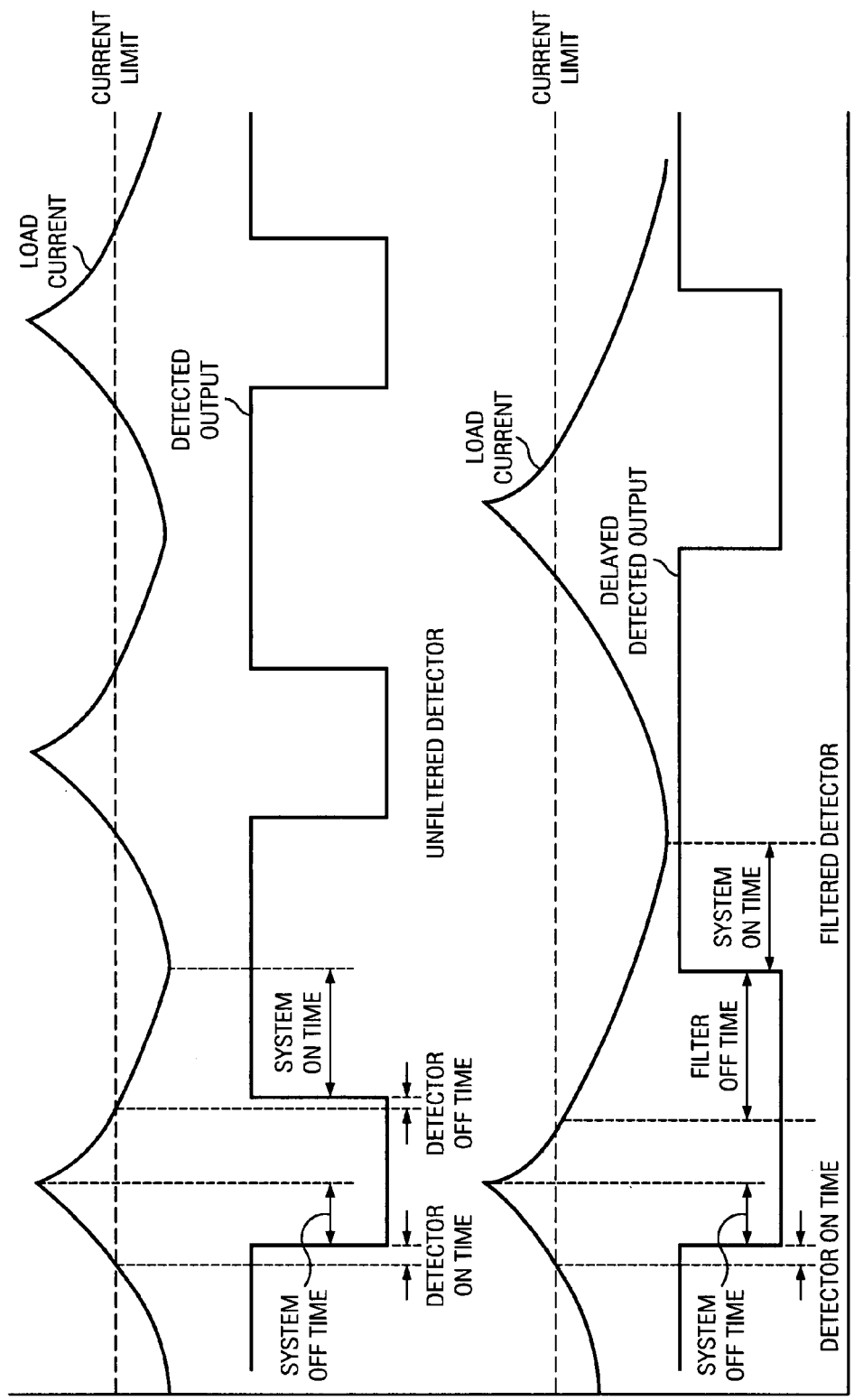

FIG. 3 is a view showing an unfiltered detector output and a filtered detector output, in accordance with an embodiment of the present invention. The unfiltered detector output herein referred is same as the detected output of the over-current comparator circuit 104, explained in conjunction with FIG. 2. The filtered detector output herein referred is same as the delayed detected output from low pass filter 106, also explained in conjunction with FIG. 2. In an embodiment of the present invention, the current limit is the maximum allowed current for system 100. The reference voltage is proportional to the current limit.

The logic output from current comparator 104 is the solid line labeled as the detected output in FIG. 3, the logic output being either high (a one), or low (a zero). In an embodiment of the present invention, when the load current is more than the current limit, over-current comparator circuit 104 switches the detected output to logic zero. Detector on-time is the inherent delay of over-current comparator circuit 104 while switching its output from logic one to logic zero. Similarly, when the load current is less than the current limit over-current comparator circuit 104 switches the detected output to logic one. Detector off-time is the inherent delay of over-current comparator circuit 104 while switching the detected output from logic zero to logic one. Further, system off-time and the system on-time, as shown in the FIG. 3, represent the response times of the remainder of the circuit, such as the one illustrated in FIG. 4, which includes one-bit multiplier 108 and the switching power supply, elements Q3, L3, D2 and C4, to changes in output from over-current comparator circuit 104.

In an embodiment of the present invention, low-pass filter 106 delays the detected output to produce the delayed detected output. A filter off-time is the time delay introduced in the detected output by low-pass filter 106. The delay in the detected output is introduced only while switching the detected output from logic zero to logic one. In an embodiment of the present invention, the delay comprises extending the logic zero state of the detected output.

Figure 4:
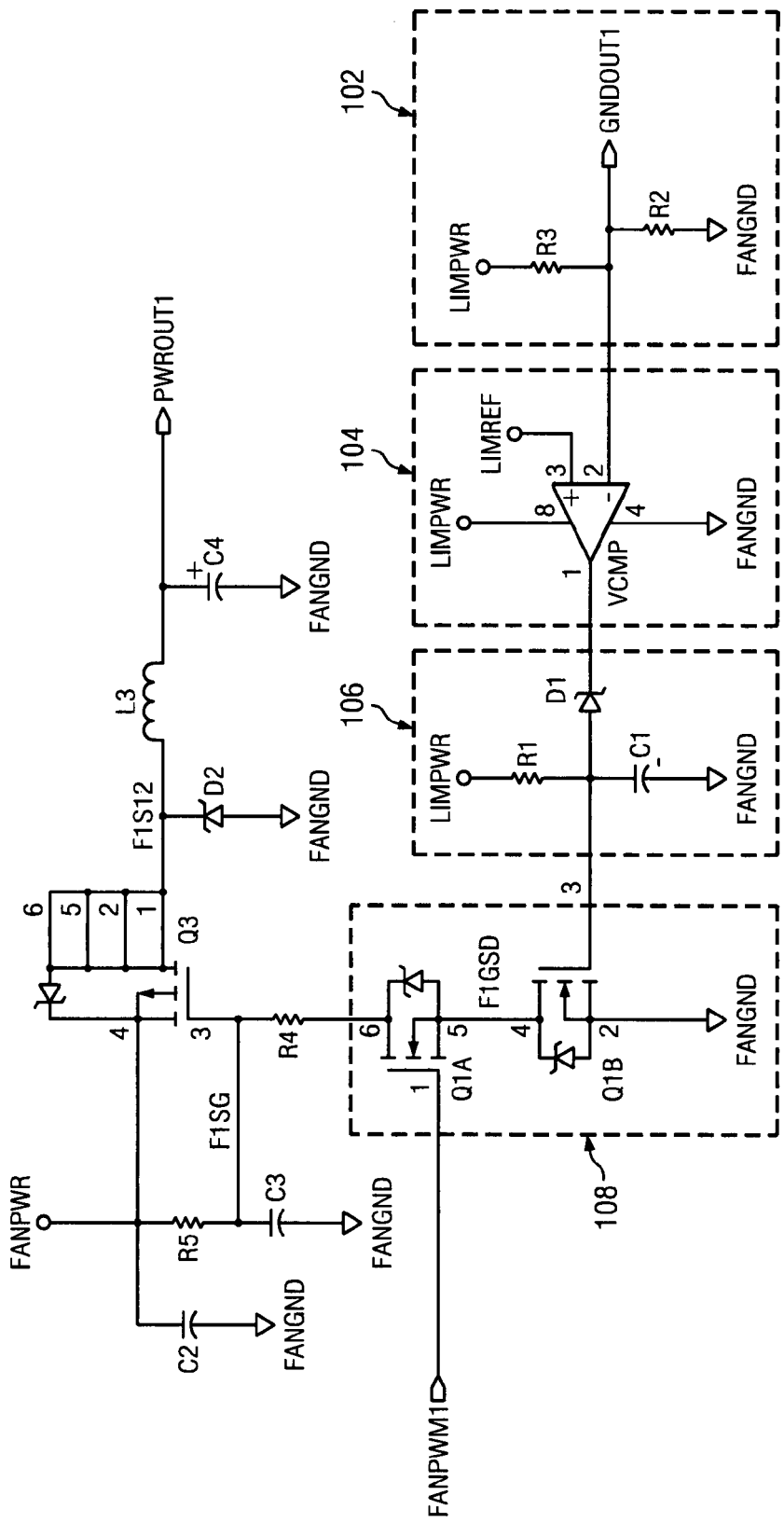

FIG. 4 illustrates a circuit diagram for current limiting using PWM control, in accordance with an embodiment of the present invention. It is to be appreciated that the circuit of this figure is provided by way of illustration only, in order to give an example of various circuit components that may be used to construct the various functional circuits of the invention. Other off the shelf components may be used in place of those depicted in the drawing, with different values, the selection of such other components within the skill of the art, and not a part of this invention. It should be further understood that the values discussed in connection with the various components are provided for illustrative purposes only, and are intended to be exemplary, and not limiting of the invention.

In an embodiment of the present invention, port GND-OUT1 receives a load current; current sensing element R2 converts the load current to a control voltage. The control voltage is provided at port 2 of voltage comparator VCMP. In an embodiment of the invention, the comparator can be an LM393/SO voltage comparator. A reference voltage is provided at port 3 of comparator VCMP. The reference voltage is proportional to a current limit of system 100. In an exemplary embodiment of the present invention, the reference voltage is 100 millivolts (mV) and the current limit is 2.13 ampere (A). Comparator VCMP produces a detected output at its port 1. The detected output is logic zero if the control voltage is more than the reference voltage. Otherwise, the detected output is logic one.

In an embodiment of the present invention, diode D1 can be a BAT54 Schottky diode. Further, logic zero at port 1 of Comparator VCMP forward biases diode D1. Forward biasing of diode D1 produces logic zero at the gate of transistor Q1B. In an embodiment of the present invention, transistors Q1B and Q1A can be the same, such as an NDC7002N field effect transistor. Further, logic zero at the gate of transistor Q1B drives transistor Q1B into a cut-off region thus pushing port 4 of transistor Q1B to a high impedance state. The high impedance state of port 4 of transistor Q1B further pushes port 6 of transistor Q1A to the high impedance state. Further, port FANPWR, the source of power for, by way of example, the power supply circuit drives the gate of transistor Q3 to logic one.

In an embodiment, transistor Q3 can be a ZXMP3A17E6 transistor. Logic one at the gate of transistor Q3 pushes transistor Q3 to cut-off region thus discharging power stored in L3 and C4 through port PWROUT1.

Logic one at port 1 of comparator VCMP reverse biases diode D1, thereby pushing diode D1 into cut-off region. Further, port LIMPWR starts charging capacitor C1. In an embodiment of the present invention, capacitor C1 can be a 100 picofarad (pf) capacitor. The time taken by the capacitor C1 to charge to a threshold voltage is equal to the filter off-time, in conjunction with FIG. 3. The threshold voltage is the voltage that pushes transistor Q1B into an active region. The delay of capacitor C1 to reach the threshold voltage allows transistor Q3 to operate in a completely on or a completely off state. Further, the delay of capacitor C1 is introduced to allow inductor L3 to discharge power. Transistor Q1B produces logic zero at port 4 of transistor Q1B. Logic zero at port 4 of transistor Q1B allows the control of transistor Q1A by FANPWM1. In an embodiment of the present invention, logic one at FANPWM1 drives transistor Q1B into an active region. Transistor Q1B further pushes port 6 of transistor Q1A to logic zero. Logic zero at port 6 of transistor Q1A drives transistor Q3 into an active region. Therefore, port PWROUT1 is driven by port FANPWR. Further, logic zero at port FANPWM1 drives transistor Q1A into a cut-off region. Cut-off of transistor Q1A drives transistor Q3 into cut-off mode, discharging power stored in L3 and C4 through PWROUT1.

In an embodiment of the invention, current sensing circuit 102 comprises port GNDOUT1, resistor R3, and resistor R2; over-current comparator circuit 104 comprises comparator VCMP; low pas filter 106 comprises resistor R1, capacitor C1, Diode D1; and one bit multiplier 108 comprises transistor Q1B, and transistor Q1A.

In an embodiment of the present invention, capacitors C4, C3, and C2 are used as by-pass capacitors. Diode D2 is used as the catch diode for the switching power supply formed by Q3, L3, C4, and D2.

As presented herein, the aspects of control of a PWM fan based on load current is independent of the master PWM signal. This independent operation allows current limiting even when the master PWM signal is operating in an open loop configuration or is controlled by factors other than load current. Moreover, the present invention regulates current with response time of the over-current comparator circuit in comparison to the slow response of fuses and circuit breakers. This instantaneous response also serves to limit inrush current on startup. Further, the present invention allows load transient without user intervention. The system returns to normal operation when the load current returns to normal condition. Moreover, the low-pass filter filters out the high-frequency component in the detected output making the detected output compatible with electromagnetic interference reduction circuits.

The present invention also protects a software controlled system in the event of failed software and recovers immediately when software is restored.

While the foregoing is directed to embodiments of the present invention, other and further embodiments of the invention may be devised without departing from the basic scope thereof, and the scope thereof is determined by the claims that follow.

The invention claimed is:

1. A system for current limiting using a Pulse Width Modulation (PWM) control, the system comprising:
   a. a current sensing circuit for sensing a load current, the current sensing circuit produces a control voltage proportional to the load current;
   b. an over-current comparator circuit for comparing the control voltage with a reference voltage, the over-current comparator circuit produces a detected output;
   c. a low-pass filter for delaying the detected output; and
   d. a multiplier for multiplying the delayed detected output with a master PWM signal.

2. The system according to claim 1, wherein the system is used for a direct current motor.

3. The system according to claim 1, wherein the detected output and the master PWM signal operate independent of each other.

4. The system according to claim 1, wherein the detected output and the master PWM signal have different frequencies.

5. The system according to claim 1, wherein the detected output and the master PWM signal have same frequencies.

6. The system according to claim 1, wherein the reference voltage is proportional to a maximum current limit.

7. The system according to claim 1, wherein the current sensing circuit comprises a resistor to generate the control voltage proportional to the load current.

8. The system according to claim 1, wherein the multiplier is a one-bit multiplier.

9. The system according to claim 1, wherein the detected output is logic zero if the load voltage is greater than the reference voltage, indicating an over-current condition.

10. A method for current limiting using Pulse Width Modulation (PWM) control, the method comprising:
    a. sensing a load current, wherein a control voltage is produced proportional to the load current;
    b. comparing the control voltage with a reference voltage, wherein the comparing produces a detected output;
    c. delaying the detected output; and
    d. multiplying the delayed detected output with a master PWM signal.

11. The method according to claim 10, wherein the detected output and the master PWM signal operate independent of each other.

12. The method according to claim 10, wherein the detected output and the master PWM signal have different frequencies.

13. The method according to claim 10, wherein the detected output and the master PWM signal have same frequencies.

14. The method according to claim 10, wherein the reference voltage is proportional to a maximum current limit.

15. The method according to claim 10, wherein the multiplying comprises bit-by-bit multiplication of the delayed detected output with the master PWM signal.

16. The method according to claim 10, wherein the delaying the detected output comprises extending off-cycle of the detected output.

17. The method according to claim 10, wherein the detected output is logic zero if the load voltage is greater than the reference voltage, indicating an over-current condition.

* * * * *